UNITED STATES PATENT OFFICE.

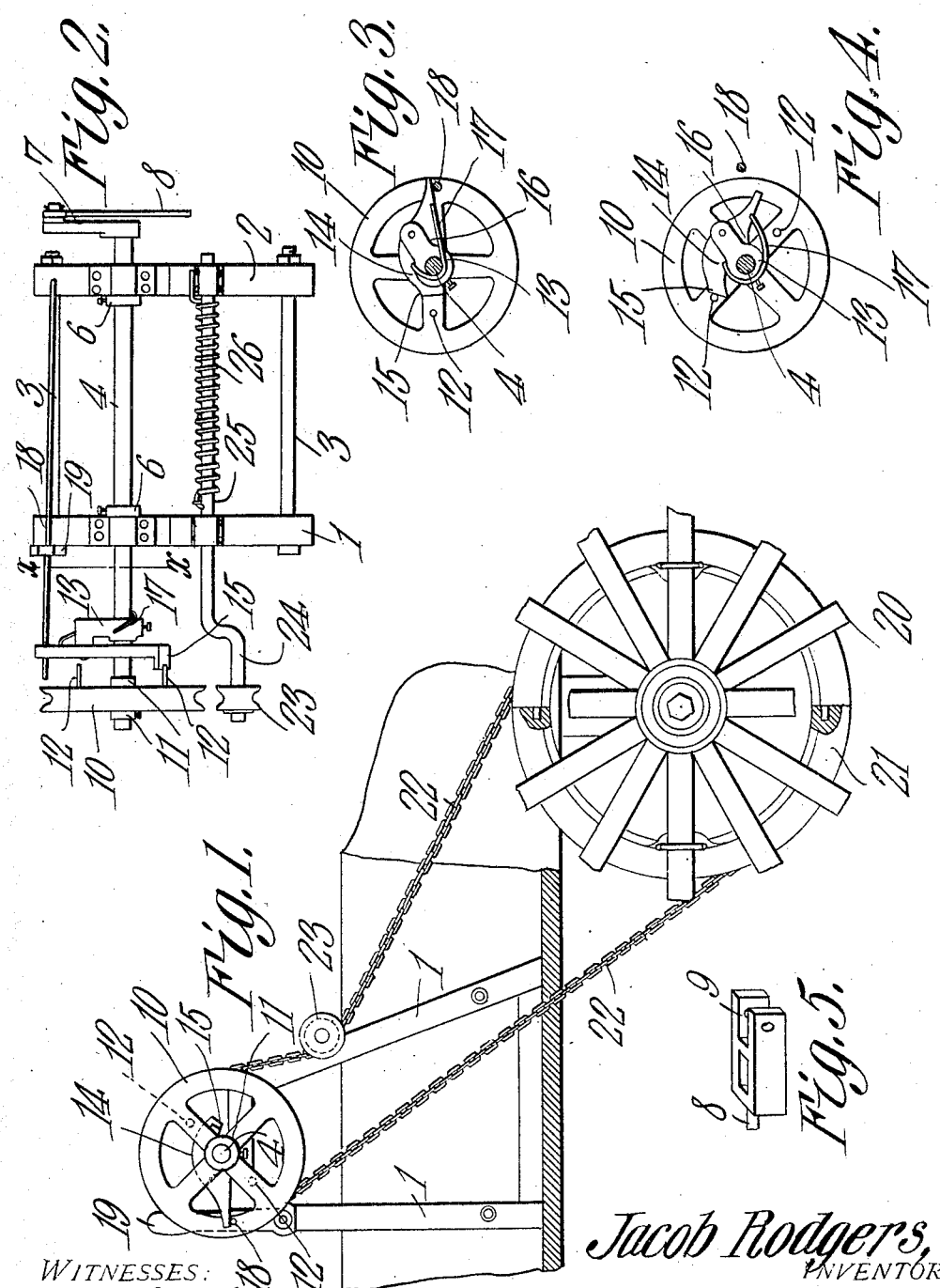

JACOB RODGERS, OF WOLF CREEK, KENTUCKY, ASSIGNOR OF ONE-HALF TO CHARLES M. SMITH, OF ANDYVILLE, KENTUCKY.

POWER ATTACHMENT FOR SPRAY-PUMPS.

No. 870,995.  Specification of Letters Patent.  Patented Nov. 12, 1907.

Application filed May 23, 1906. Serial No. 318,410.

*To all whom it may concern:*

Be it known that I, JACOB RODGERS, a citizen of the United States, residing at Wolf Creek, in the county of Meade and State of Kentucky, have invented a new and useful Automatic Wheel Power Attachment, of which the following is a specification.

This invention relates to power attachments for spray pumps, its object being to simplify the construction of the mechanism and to render the same durable and efficient.

A still further object is to provide means whereby the mechanism can be readily thrown out of operative relation with the drive wheel from which power is obtained and automatically returned into operative relation.

With these and other objects in view, the invention consists of certain novel features of construction and combinations of parts which will be hereinafter more fully described and pointed out in the claims.

In the accompanying drawings is shown the preferred form of the invention.

In said drawings:—Figure 1 is a view partly in side elevation and partly in section showing the mechanism operatively connected with a traction wheel; Fig. 2 is a plan view of the apparatus with the drive chain removed; Fig. 3 is a section on line x—x, Fig. 2 and showing the dog disengaged from the drive pulley; Fig. 4 is a similar view showing said dog in engagement with the pulley; and Fig. 5 is a detail view of a coupling for use in connection with the apparatus.

Referring to the figures by characters of reference, 1 and 2 are suitable uprights connected at desired points by cross members 3 and these uprights are adapted to be secured in any desired manner within a vehicle body. The uprights constitute supports and bearings for a shaft 4 which is held against longitudinal movement by means of collars 6 secured thereon in any desired manner and adapted to bear against the adjoining faces of the uprights. A crank 7 is secured to one end of the shaft 4 and is adapted to actuate a rod 8 which, as shown in Fig. 5, extends from a yoke 9 adapted to be connected to the pump, not shown. A pulley 10 is loosely mounted on one end of the shaft 4 and is held against lateral movement by collars 11 which are secured to the shaft by set screws or in any other preferred manner. This pulley has laterally extending pins 12 thereon at diametrically opposite points. A collar 13 is fastened in any desired manner to the shaft 4 adjacent the inner collar 11, and pivotally mounted on this collar and above the collar 11 is a dog 14 having an offset head 15 at one end while a downwardly depending lip 16 is formed upon the dog adjacent the pivot thereof. This lip is adapted to bear against the shaft 4 to limit the rocking movement of the dog. The head 15 is held normally in the path of the pins 12 by a spring 17 secured at its ends to the dog 14 and collar 13, and when the wheel 10 is rotated in one direction one of the pins 12 is adapted to bear against the head and cause the shaft 4 to rotate therewith.

An actuating rod 18 is pivotally connected at one end to one of the uprights 2 and this rod extends through an operating lever 19 fulcrumed upon the upright 1. The swinging end of the rod 18 is held normally out of the path of the dog 14, but by swinging the lever 19 toward the shaft 4 the end of the rod 18 will be moved into the path of dog 14 and will cause the head of said dog to swing downward out of the path of the pin 12 engaged thereby. The dog 14 will therefore be uncoupled from the wheel 10 against the tension of the spring 17 and said wheel can therefore rotate without causing any corresponding movement of the shaft 4. The spring 17 will return the dog to its initial position as soon as the rod 18 is swung away from the dog. In order that motion may be transmitted to the wheel 10 from a traction wheel 20 a pulley 21 is secured to the spokes of the traction wheel in any desired manner and a chain 22 extends therearound and around the wheel 10. This drive chain may be held taut in any preferred manner as by means of an idler 23 mounted upon a crank 24 carried by a shaft 25 on which is mounted a spring 26 which serves to normally press the idler 23 against the chain.

It will be understood that when the wheels 20 and 21 are rotated in one direction motion will be transmitted through the chain 22 to the wheel 10. The dog 14 is normally disposed with its head 15 in the path of the pins 12 and one of said pins normally bears against the head and causes the shaft 4 to rotate with the wheel 10, thereby actuating the beam through the crank 7 and rod 8. When it is desired to disconnect the dog 14 and wheel 10 the rod 18 is swung into the path of the dog by means of lever 19 and said dog will swing downward thereagainst so that the head 15 will move beneath the path of the pins and said pins and the pulley or wheel 10 be free to rotate independently of the shaft 4.

A power device such as herein described can be placed upon any form of vehicle and can be used to actuate any one of the various forms of spray pumps.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:—

1. An attachment of the character described comprising a shaft, a spring controlled dog revoluble therewith, a wheel loosely mounted on the shaft, means upon the wheel for engaging the dog, means for rotating the wheel, and means movable into the path of the dog for shifting the dog out of engagement with said engaging means and positively holding the shaft against rotation.

2. An attachment of the character described comprising standards, a shaft rotatably mounted thereon, a wheel loosely mounted upon the shaft, a laterally projecting device upon the wheel, a spring-controlled dog pivotally connected to and rotatable with the shaft, the pivot of the dog extending transversely of the plane of movement thereof, an offset head upon the dog normally projecting into the path of the laterally extending device to permit continuous rotation of the shaft and wheel in unison, and manually operated means for shifting the head out of the path of said device to hold the shaft against movement during the rotation of the wheel.

3. An attachment of the character described comprising standards, a shaft rotatably mounted thereon, a wheel loosely mounted upon the shaft, a laterally extending pin upon the wheel, a spring-controlled dog pivotally mounted upon and rotatable with the shaft, the pivot of said dog extending transversely of the plane of movement thereof, an offset head upon the dog and movable into the path of the pin to permit the rotation of the wheel and shaft in unison, a stop lip upon the dog, and manually operated means for engaging the dog to shift the head from the path of the pin to hold the shaft against movement and permit independent rotation of the wheel.

JACOB RODGERS.

Witnesses:
C. R. SMITH,
J. S. STEWART.